(12) United States Patent
Fisher et al.

(10) Patent No.: US 10,744,571 B2
(45) Date of Patent: Aug. 18, 2020

(54) ROTATING TOOL HAVING A TOOL ANCHORAGE ARRANGEMENT FOLLOWING A STEPPED PATH AND METHOD OF POSITIONING SAID TOOL

(71) Applicant: Iscar, Ltd., Tefen (IL)

(72) Inventors: Raz Fisher, Ramat Gan (IL); Hanoch Guy, Petach Tikva (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 16/364,816

(22) Filed: Mar. 26, 2019

(65) Prior Publication Data

US 2019/0217399 A1 Jul. 18, 2019

Related U.S. Application Data

(63) Continuation of application No. PCT/IL2017/051016, filed on Sep. 11, 2017.
(Continued)

(51) Int. Cl.
*B23B 31/107* (2006.01)
*B23B 31/00* (2006.01)
(Continued)

(52) U.S. Cl.
CPC .......... *B23B 31/005* (2013.01); *B23B 31/028* (2013.01); *B23B 31/113* (2013.01);
(Continued)

(58) Field of Classification Search
CPC ... B23B 31/005; B23B 31/028; B23B 31/113; B23B 2231/0256; B23B 2231/0268; B23B 2231/46; B23B 2231/0264; B23B 2240/04; B23B 2231/0284; B23B 2231/0276; B23B 2231/026; Y10T 408/907; Y10T 279/17837; Y10T 279/17923; B25D 2217/0034
See application file for complete search history.

(56) References Cited

U.S. PATENT DOCUMENTS 1,413,280 A * 4/1922 Kengel ................. B23B 31/113
279/76
1,424,743 A 8/1922 Smith
(Continued)

FOREIGN PATENT DOCUMENTS

DE 10100024 A1 7/2002

OTHER PUBLICATIONS

International Search Report dated Jan. 12, 2018, issued in PCT counterpart application (No. PCT/IL2017/051016).
Written Opinion dated Jan. 12, 2018, issued in PCT counterpart application (No. PCT/IL2018/051016).

*Primary Examiner* — Sunil K Singh
*Assistant Examiner* — Paul M Janeski
(74) *Attorney, Agent, or Firm* — Womble Bond Dickinson (US) LLP

(57) ABSTRACT

A rotating tool includes a circumferential surface formed with a tool anchorage arrangement. The tool anchorage arrangement follows a stepped path. The tool anchorage arrangement includes an entry recess and, subsequent thereto, a radial recess and, subsequent thereto, an axial recess. Additional radial and axial recesses may be alternated to increase the number of steps, thereby extending the length of the stepped path.

18 Claims, 4 Drawing Sheets

Related U.S. Application Data

(60) Provisional application No. 62/401,231, filed on Sep. 29, 2016.

(51) Int. Cl.
*B23B 31/02* (2006.01)
*B23B 31/113* (2006.01)

(52) U.S. Cl.
CPC ............. *B23B 2231/0256* (2013.01); *B23B 2231/0268* (2013.01); *B23B 2231/46* (2013.01)

(56) References Cited

U.S. PATENT DOCUMENTS

| | | | |
|---|---|---|---|
| 2,540,937 A | | 2/1951 | Edens |
| 2,731,273 A | | 1/1956 | Edens |
| 2,801,860 A | | 8/1957 | Getts |
| 3,534,640 A | * | 10/1970 | Macy .............. B23B 31/113 408/226 |
| 4,148,593 A | | 4/1979 | Clark |
| 4,512,692 A | | 4/1985 | Nielsen |
| 5,868,533 A | | 2/1999 | Fiala |
| 8,505,893 B2 | | 8/2013 | Haimer |
| 2009/0110500 A1 | * | 4/2009 | Miller .............. B23B 31/005 408/204 |
| 2011/0318121 A1 | * | 12/2011 | Eriksson .......... B23B 31/005 407/102 |
| 2014/0210169 A1 | | 7/2014 | Mizoguchi |

* cited by examiner

ROTATING TOOL HAVING A TOOL ANCHORAGE ARRANGEMENT FOLLOWING A STEPPED PATH AND METHOD OF POSITIONING SAID TOOL

RELATED APPLICATIONS

This is a Bypass Continuation of International Patent Application No. PCT/IL2017/051016, filed 11 Sep. 2017 and published as WO2018/0609871A1, which claims priority to U.S. Provisional Patent Application No. 62/401,231, filed 29 Sep. 2016. The contents of the aforementioned applications are incorporated by references in their entirety.

FIELD OF THE INVENTION

The subject matter of the present application relates to a rotating tool comprising a tool anchorage arrangement to prevent slippage and/or pull-out of the tool relative to a component with a mating anchorage arrangement, and more precisely to a tool anchorage arrangement which follows a stepped path. The present invention is beneficial to rotating tools in general to prevent pull-out and is of particular benefit to tools such as end mills and chucks designed to hold same, as an auxiliary clamping means.

BACKGROUND OF THE INVENTION

One problem that can occur during rotational tool operations is axial migration or extraction of a tool from a component secured to it (the tool can be, for example, a solid end mill, and the component can be, for example, a chuck), otherwise called herein "pull-out".

A separate problem, which in some cases is connected to pull-out, can be slippage between the rotational tool and connected component.

The present application is directed to a component which may in preferred embodiments be a chuck. For the purposes of the specification and claims, it is noted that: the term "chuck" is inclusive also of what are also called collets; and the term "rotation" even if not mentioned explicitly to be relative, is intended to be understood as relative motion between two components.

U.S. Pat. No. 8,505,893 discloses, inter alia, an anchorage arrangement with at least one helically extending groove. A benefit of such arrangement of such continuous or smoothly extending groove is that it can allow the tool to be clamped to a chuck at any desired position along the groove (which allows sufficient clamping strength). In other words there are infinite clamping positions. Further, the groove can be relatively simply produced.

By contrast, shown in FIG. 18 of U.S. Pat. No. 8,505,893 is an example of an anchorage arrangement following, what is can be referred to as an "alternating path". The path first extends in an axial direction and then notably changes direction to extend in a radial direction. Stated differently, there is a discontinuity in the path. A benefit of such arrangement is that the clamping position is a defined location allowing a user to swiftly and easily join the two components without any need to select a particular depth of insertion or position. Similar anchorage arrangements with alternating paths can be found in various other publications, e.g., U.S. Pat. Nos. 1,424,743, 2,540,937, 2,731,273 and 2,801,860. An alternating path can also be described as comprising sections of the path which visibly differ in direction (i.e. a discontinuity in the path is visible).

SUMMARY OF THE INVENTION

In accordance with a first aspect of the subject matter of the present application, there is provided a rotating tool comprising a circumferential surface formed with a tool anchorage arrangement following a stepped path defining at least two clamping locations.

In accordance with a second aspect, there is provided a tool anchorage arrangement comprising an entry recess and, subsequent thereto, a radial recess and, subsequent thereto, an axial recess.

In accordance with a third aspect, there is provided a rotating tool having a tool axis defining opposite tool forward and backward tool directions and opposite tool rotation and reverse-rotation directions, the rotating tool comprising: a rear end; a front end located forward of the rear end; and a circumferential surface extending forward of the rear end; the circumferential surface being formed with a tool anchorage arrangement; the tool anchorage arrangement following a stepped path and comprising: an entry recess extending forward from the rear end; a radial recess intersecting and extending in the tool rotation direction from, the entry recess; and an axial recess intersecting, and extending forward from, the radial recess.

It will be understood that the aspects described above basically define a stepped path comprising at least two turns. Stated differently, the tool anchorage arrangement provides at least two defined clamping locations (i.e. at the end of the first turn or at the end of the second turn).

While such a stepped path is detrimental when compared with a smoothly curved or straight path in the sense that it provides less clamping position options and is more complex to manufacture, these disadvantages are believed offset by an increased user friendliness in that the limited clamping positions defined are more easily utilized.

Conversely, while such a stepped arrangement is less user friendly than an anchorage arrangement with a single well-defined clamping position (i.e. comprising a single turn as shown in the publications identified above) such detriment is offset by providing a plurality of clamping options, albeit a lesser number than the smooth path option.

In accordance with a fourth aspect, there is provided a component with a mating anchorage arrangement in the form of at least one protuberance.

In accordance with a fifth aspect, there is provided a method of positioning a rotating tool comprising a tool anchorage arrangement relative to a component with a mating anchorage arrangement. The method comprising slidably joining the components by relative motion in a first direction, changing the direction to a second direction and relatively moving the tool and component into further contact with each other and, if desired, again moving the components in the first direction to further bring the tool and component into further contact. The subsequent alternating movements in the first and second direction can be repeated until a desired position is reached.

Once a desired position is reached a subsequent step of securing the rotating tool and component to each other (e.g. via clamping) can be carried out.

In accordance with a sixth aspect, there is provided a method of positioning a rotating tool in accordance with any one of the first three aspects and a component in the form of a chuck; the tool's circumferential surface being an external surface of the tool; the chuck comprising an internal circumferential surface defining a tool-receiving bore and a bore axis defining opposite component forward and backward directions and opposite component rotation and reverse-rotation directions; the bore surface being formed with a mating anchorage arrangement configured to mate with the tool anchorage arrangement and comprising at least one protuberance extending inwardly into the bore; the method comprising the steps of:

a. inserting the rotating tool's rear end into the tool-receiving bore in the component backward direction such that the at least one protuberance projects into the entry recess;

b. subsequent to step (a), rotating the rotating tool relative to the chuck such that the at least one protuberance projects into the radial recess;

c. subsequent to step (b), moving the rotating tool further in the component backward direction such that the at least one protuberance projects into the axial recess; and d. subsequent to step (c), if the rotating tool has not yet reached a desired position in the chuck, repeating the step (b) and, if needed, step (c) repeatedly until the rotating tool is at a desired position in the chuck.

In accordance with a seventh aspect there is provided a tool assembly comprising a rotating tool and a component, each being in accordance with one of the aspects described above.

It will be noted that a benefit of such tool assembly is that it can be devoid of a preset screw. In other words an element typically used to position the rotating tool can be, together with the cost thereof, eliminated.

In accordance with an eighth aspect there is provided a method of producing a tool anchorage arrangement, the method comprising steps of: moving a grinding wheel along a circumferential surface in a tool rotation direction to grind a radial recess; moving the grinding wheel in an opposite tool reverse-rotation direction and subsequently grinding in a forward or backward direction along the tool.

The movement of the grinding wheel in the tool rotation direction is different than in the opposite reverse-rotation direction. More precisely, the movement can be 3 to 10 times a movement in an opposite direction. For example, if movement in the tool rotation direction is 35° and the tool reverse-rotation direction is 5°, the movement in the tool rotation direction is considered 7 times greater than the movement in the opposite direction.

It is understood that the above-said is a summary, and that any of the aspects above may further comprise any of the features described in connection with any of the other aspects or described hereinbelow. Specifically, the following features, either alone or in combination, may be applicable to any of the above aspects:

i. A rotating tool can comprise a rear end, a front end located forward of the rear end and a circumferential surface extending forward of the rear end.

ii. A rotating tool can comprise a cutting portion configured for machining when the rotating tool is rotated relative to a workpiece in the tool rotation direction.

iii. A rotating tool can have a tool axis. The tool axis can extend longitudinally. The tool axis can extend through the center of the rotating tool. The tool axis can define opposite tool forward and backward directions and opposite tool rotation and rear-rotation directions.

iv. A circumferential surface can be formed with a tool anchorage arrangement following a stepped path. Preferably the circumferential surface can further comprise two additional tool anchorage arrangements. Stated differently the circumferential surface can preferably be formed with exactly three tool anchorage arrangements. Preferably all anchorage arrangements formed on a circumferential surface can have the same geometry.

v. A circumferential surface can be an internal surface (e.g. a bore surface). Alternatively, a circumferential surface can be an external surface (e.g. a peripheral surface of a shank).

vi. A circumferential surface can have a tapered or cylindrical shape.

vii. A tool anchorage arrangement can comprise an entry recess, a radial recess and an axial recess. The tool anchorage arrangement can comprise an additional radial recess. The tool anchorage arrangement can comprise an additional axial recess. The tool anchorage arrangement can comprise a plurality of radial and axial recesses. The plurality of radial and axial recesses can follow a stepped path.

viii. A tool anchorage arrangement can extend less than half the length of a shank portion.

ix. An anchorage arrangement can comprise a starting recess and an ending recess distally located from the entry recess. The starting recess can be constituted by an entry recess and the ending recess can be either a radial recess or an axial recess. Preferably the ending recess can be a radial recess.

x. An entry recess can extend forward from a rear end. In a case where a tool comprises a plurality of tool anchorage arrangements, preferably the entry recess of each of the tool anchorage arrangements is equally circumferentially spaced about the tool axis.

xi. A radial recess can intersect an entry recess. In embodiments where a tool anchorage arrangement comprises more than one radial recess, a radial recess which is not the radial recess adjacent to the entry recess can intersect an axial recess.

xii. An extension of one or each radial recess can be perpendicular with a tool axis or at an angle of ±45°, preferably ±15°. When this feature is stated without a specified angle, it is intended to mean perpendicular within ±5°.

xiii. An extension of one or each axial recess can be parallel with a tool axis or at angle of ±45°, preferably ±15°. When this feature is stated without a specified angle it is intended to mean perpendicular within ±5°.

xiv. A radial recess can extend in the tool rotation direction from an entry recess. In embodiments where a tool anchorage arrangement comprises more than one radial recess, a radial recess, which is not the radial recess adjacent to the entry recess, can extend in the tool rotation direction from an axial recess. Stated differently, a radial recess can intersect, and extend in a tool rotation direction from, a preceding axial recess (i.e. an axial recess backward thereof). Each radial recess can have the same geometry as every other radial recess. Generally speaking, in connection with the radial recess and other elements in the specification and claims, the words "same geometry" means the same size and shape.

xv. A radial recess can comprise an alignment portion which extends further in the tool rotation direction than an axial recess subsequent thereto. The alignment portion can preferably have a tapering shape. The alignment portion can have an alignment height measurable parallel with the tool axis which is smaller than an axial height of the axial recess.

xvi. An axial recess can intersect a radial recess. An axial recess can extend forward from a radial recess. Each axial recess can have the same geometry as every other axial recess. The comments in the previous paragraph are also applicable here, mutatis mutandis.

xvii. A component can comprise a circumferential surface. The circumferential surface can be formed with a mating anchorage arrangement.

xviii. A mating anchorage arrangement can be in the form of a protuberance. The number of mating anchorage arrangements of a component can correspond to the number of tool anchorage arrangements of a rotating tool. Preferably, a component can comprise exactly three equally circumferentially spaced mating anchorage arrangements. One or each protuberance can comprise an elongated convex surface. A preferred direction of elongation can be perpendicular to a tool or bore axis. Preferably one or each protuberance is permanently connected to the component (i.e. not detachable or able to be repositioned relative to the remainder of the component).

xix. A component can be a chuck. The chuck can comprise an internal circumferential surface defining a tool-receiving bore and a bore axis defining opposite component forward and backward directions and opposite component rotation and rear-rotation directions.

xx. A component's bore can have a tapered or cylindrical shape.

xxi. A rotating tool can be positioned relative to another component by slidably joining the components by relative motion in a first direction, changing the direction to a second direction and relatively moving the tool and component into further contact with each other. The positioning can further comprise again moving the components in the first direction to further bring the tool and component into further contact. The positioning can further comprise again moving the components in the second direction to further bring the tool and component into further contact. The movement in the first and second directions can be repeated to achieve a desired position. Once a desired position is reached a subsequent step of securing the rotating tool and component to each other (e.g. via clamping) can be carried out.

xxii. A rotating tool can be positioned relative to a chuck by inserting the rotating tool's rear end into a tool-receiving bore in the component backward direction such that the at least one protuberance projects into the entry recess; subsequently rotating the rotating tool relative to the chuck such that the at least one protuberance projects into a radial recess; subsequently moving the rotating tool further in the component backward direction such that the at least one protuberance projects into an axial recess. Optionally, further relative movement can be carried out in the same directions as stated above.

xxiii. A rotating tool can be positioned by further rotating the tool relative to the chuck in a tool reverse-rotation direction until the at least one protuberance projects into an alignment portion, and a subsequent step can further comprise an initial sub-step of rotating the rotating tool relative to the chuck in a tool rotation direction an amount smaller than the previous step such that the at least one protuberance is aligned with the axial recess to allow said moving of the rotating tool defined in the subsequent step.

xxiv. A tool assembly can be devoid of a preset screw.

Despite the stated preference above related to the protuberance shape and orientation, it must be noted that it is also possible to utilize a protuberance which is not elongated. If it is elongated, it can also be oblique to form a helix angle with the tool or bore axis (e.g. an "oblique protuberance" rather than, if the bore or tool axis is considered vertical, a "horizontal protuberance"). Generally speaking, the possibility for such tool anchorage arrangement to be compatible with any number of protuberance shapes (including both horizontal and oblique protuberances) can be an advantage of the stepped path design.

It is further noted that when the preferred "horizontal protuberance" is utilized a single chuck can be used for both right-handed and left-handed tools. Whereas for the traditional oblique groove design shown in U.S. Pat. No. 8,505, 893 requires a corresponding right-handed or left-handed chuck to accommodate the cutting direction of the tool.

BRIEF DESCRIPTION OF THE DRAWINGS

For a better understanding of the subject matter of the present application, and to show how the same may be carried out in practice, reference will now be made to the accompanying drawings, in which.

DETAILED DESCRIPTION

Figure 6:
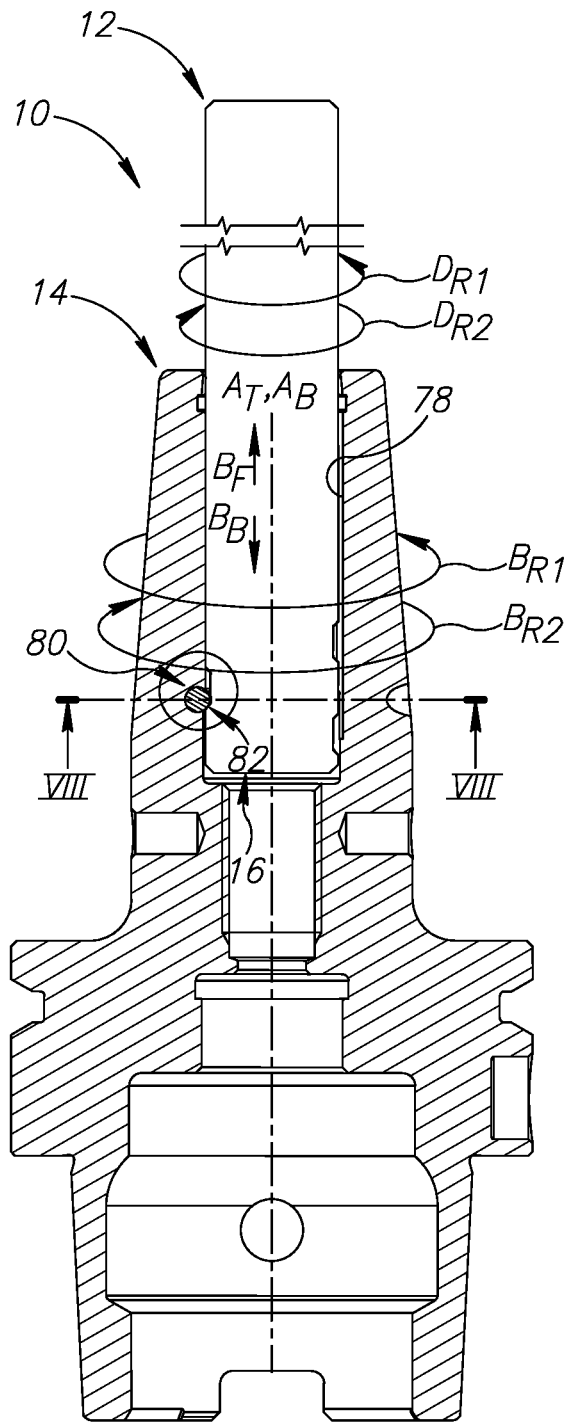
FIG. 6 is a side section view of a chuck and a portion of the rotating tool in FIGS. 1 to 4 (not sectioned) chucked thereto (i.e. secured in an assembled operational position thereto)

FIG. 6 illustrates an example tool assembly 10 comprising a rotating tool 12 exemplified as an end mill and secured to a component 14 exemplified as a chuck.

Figure 1:
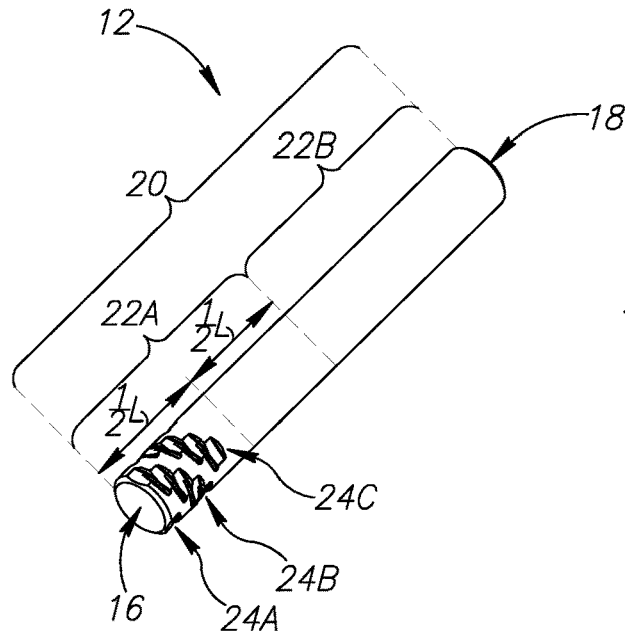
FIG. 1 is a schematic perspective view of a rotating tool.
Figure 2:
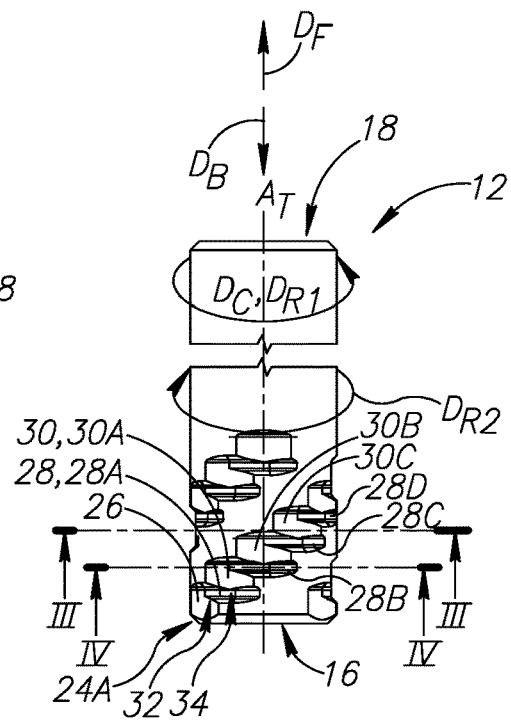
FIG. 2 is a side view of a portion of the rotating tool in FIG. 1.

Drawing attention to FIGS. 1 and 2, the rotating tool 12 can comprise opposing rear and front ends 16, 18 and a circumferential surface 20 extending therebetween.

A tool axis $A_T$ can extend longitudinally through the center of the rotating tool 12. More precisely, the tool axis $A_T$ can extend through the center of the rear and front ends 16, 18 and can define opposite tool forward and backward directions $D_F$, $D_B$ and opposite tool rotation and tool reverse-rotation directions $D_{R1}$, $D_{R2}$.

In the non-limiting example shown, the rotating tool 12 is exemplified as an end mill comprising a shank portion 22A extending forward of the rear end 16 and a cutting portion 22B located forward of the shank portion 22A.

Due to the schematic nature of the figures, geometric cutting edge(s) of the cutting portion are not shown. However it should be noted that the schematic cutting portion is configured to machine in a cutting direction $D_C$. The cutting direction $D_C$ is the same direction as the tool rotation direction $D_{R1}$, the reason for which is discussed below.

The circumferential surface 20 can be formed with three equally circumferentially spaced tool anchorage arrangements 24 (e.g., first, second and third tool anchorage arrangements 24A, 24B, 24C) each following a stepped path and having the same geometry. The description below will focus on the first tool anchorage arrangement 24A, it being understood that comments about any one of the tool anchorage arrangements are applicable to the others.

The first tool anchorage arrangement 24A can comprise an entry recess 26, at least one radial recess 28 and at least one axial recess 30. As seen in the figures, a radial recess 28 alternates with an axial recess 30 and together each such pair of recesses forms a "step" of a path that at least partially winds around the tool's circumferential surface in the tool forward direction $D_F$. Due to this winding action formed by the steps, the first tool anchorage arrangement 24A can be considered to constitute a "stepped path".

While, as shown, the first tool anchorage arrangement 24A comprises not only a first radial recess 28A, but additional radial recesses 28B, 28C, 28D etc., and similarly comprises not only a first axial recess 30A, but additional axial recesses 30B, 30C etc., the description below will initially focus on only the first radial and axial recesses 28A, 30A, since the remainder have the same geometry and are optionally added to extend the tool anchorage arrangements to a desired length along the circumferential surface 20. Preferably, tool anchorage arrangement 24A extends less than half the length of the shank portion 22A as indicated by the reference "1/2L" from the rear end 16. Restricting the length to being smaller than half the length of the shank portion 22A allows the remainder thereof for gripping by the chuck 14.

Except for the entry, radial and axial recesses 26, 28, 30 of the anchorage arrangements 24, the circumferential surface 20, or at least at the shank portion 22A thereof, has a typical circular cross section defining a circumferential surface diameter $D_S$ and corresponding circumferential surface radius $R_S$. In the current example in which the shank portion 22A is cylindrical, the circumferential surface diameter $D_S$ has a constant value.

Figure 3:
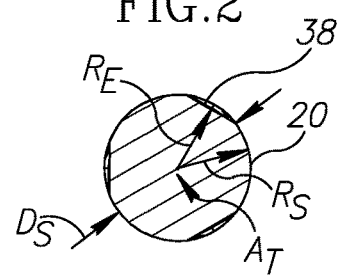
FIG. 3 is a cross section view taken along line III-III in FIG. 2.
Figure 4:
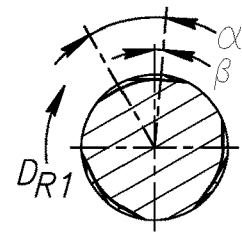
FIG. 4 is a cross section view taken along line IV-IV in FIG. 2.
Figure 5:
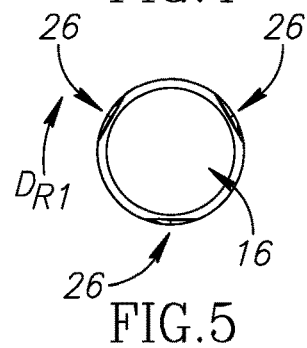
FIG. 5 is an end view of a rear end of the rotating tool in FIGS. 1 to 4.

Referring also to FIGS. 3 to 5, a method for producing the first tool anchorage arrangement 24A can be as follows.

Starting with a rotating tool having no portion of a tool anchorage arrangement, as a first grinding step, a grinding wheel (not shown) can be moved along the rotating tool 12 from the rear end 16 in the tool forward direction $D_F$ to grind the entry recess 26 starting from the rear end 16. Subsequently, as a second grinding step, the grinding wheel can be redirected to move, relative to the rotating tool 12, in the tool rotation direction $D_{R1}$ to form the first radial recess 28A. It will be understood that there is an area of first intersection 32 (or, called differently, a first common recessed area 32) shared by both the entry recess 26 and the first radial recess 28A. Subsequently, as a third grinding step the grinding wheel can be redirected again to move in the tool forward direction $D_F$ to form the first axial recess 30A. Similarly, there is an area of second intersection 34 (or, called differently, a second common recessed area 34) shared by both the first radial recess 28A and the first axial recess 30A.

The entirety of the first tool anchorage arrangement 24A can be formed as described above, and additional radial and axial recesses 28, 30 can be produced by repeating the second and third grinding steps above. It is understood that the circumferentially spaced apart second 24B and third 24C tool anchorage arrangements can similarly be produced by starting with the first grinding step to form the entry recess, and then alternating the second and third grinding steps to form the desired number of radial and axial recesses.

Alternatively, a method of production could be carried out, for example, in reverse order, i.e. with the entry recess 26 being the last recess of any one or more of the first, second and/or third tool anchorage arrangements 24A, 24B, 24C produced.

While such production method may be comparatively more complicated and expensive than producing a single continuous recess, it is believed the benefit compensates for such detriment.

While the tool forward direction $D_F$ described above is parallel with the tool axis $A_T$ and the tool rotation direction $D_{R1}$ is perpendicular thereto (or, stated differently, rotates therearound), it will be understood that with respect to the tool anchorage arrangements 24 and the recesses thereof, such directions should be understood, unless stated otherwise explicitly, as general directions within 5°. Also, while the entry and axial recesses shown in the figures are seen to extend generally parallel to the tool axis $A_T$, in some embodiments (not shown), the entry and axial recesses may be angled relative to the tool axis $A_T$ by, e.g., up to 45°.

In any case, while there is a preference for the orthogonal regular staggered shape anchorage arrangement shown, it will be understood that adjacent recesses extending at orientations other than from 90° and even at non-uniform angles is a feasible option.

Further details of the entry, radial and axial recesses 26, 28, 30 will now be described referring to FIG. 9.

Each entry recess 26 can comprise an entry recessed area 36 defined within opposing entry lower and upper edges 38, 40, and opposing entry first and second side edges 42, 44.

The entry lower edge 38 is located at an intersection of the circumferential surface 20 and the rear end 16. As best shown in FIG. 3, the entry lower edge 38 is located closer to the tool axis $A_T$ than the adjacent circumferential surface 20, thereby allowing passage of even a permanently fixed position protuberance (described below) therepast.

By contrast, the entry upper edge 40 extends along the circumferential surface 20, thereby constituting an upper abutment surface (providing a physical, e.g., tactile, indicator to a user that relative movement along the tool axis $A_T$ has been halted and that redirection is needed). Optionally, an entry intermediate area 46 can be formed with a concave or ramping geometry between the entry recessed area 36 and the entry upper edge 40. For example, such geometry is also an option for the entry first and second side edges 42, 44 or any other edges of the tool anchorage arrangement 24 which are not configured to allow passage of a protuberance therepast. Nonetheless, with a different grinding wheel shape or production method such concave or ramping geometry may be absent.

Similarly, the entry first side edge 42 can extend in an axial direction along the circumferential surface 20 between the entry lower and upper edges 38, 40, thereby constituting a side abutment surface (particularly when a component comprising a protuberance is being removed from the anchorage arrangement, i.e. during disengagement of the rotating tool 12 and the component 14).

By contrast, the entry second side edge 44 (being the side edge of the entry recess furthermost in the tool rotation direction $D_{R1}$) can extend from the entry lower edge 38 in the tool forward direction $D_F$ only until a first area of intersection 48 of the entry recess 26 and the first radial recess 28A.

Similarly, and more precisely, the entry upper edge 40 extends circumferentially from the entry first side edge 42 until the first area of intersection 48.

Each radial recess 28 can comprise a radial recessed area 50 defined within at least an area bordered by a radial lower edge 52 and a radial side edge 54 (on the side of the radial recess 28 furthermost in the tool rotation direction $D_{R1}$).

Figure 11:
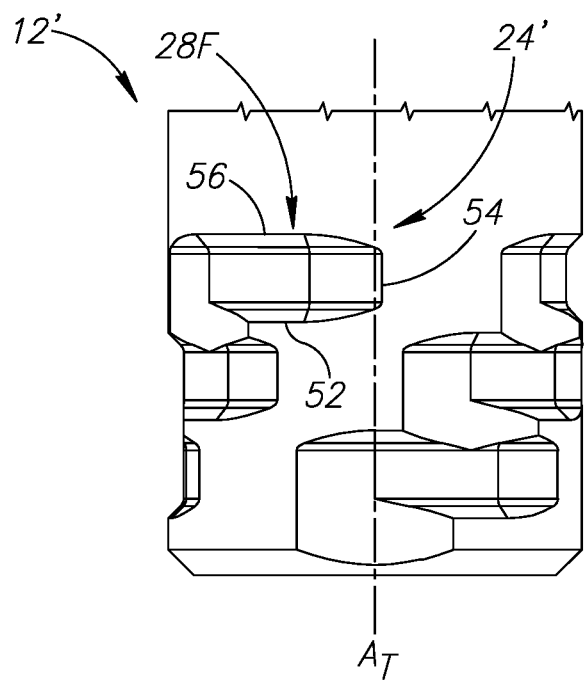
FIG. 11 is a similar view to FIG. 9, except showing a different tool anchorage embodiment.

As shown in FIG. 11 in embodiments where a radial recess 28F is a final recess of an anchorage arrangement 24', the final recess 28F can further comprise a radial upper edge 56 opposing the radial lower edge 52. The radial upper edge 56 of final radial recess 28F serves as a final forward axial stop for the rotating tool 12, while the radial side edge 54 of final radial recess 28F serves as a final circumferential stop for the rotating tool 12.

Reverting to the description of a non-final radial recess, such radial recess 28 has only two edges: the radial lower edge 52 for abutment with a protuberance to anchor the rotating tool 12 to the component 14 which comprises the protuberance; and the radial side edge 54 to provide an abutment surface (providing a physical, e.g., tactile, indicator to a user that relative movement along the axis has been halted and that redirection is needed).

Each axial recess 30 can comprise an axial recessed area 58 defined within an axial upper edge 60, and opposing axial first and second side edges 62, 64.

The axial recessed area 58 can extend from a second area of intersection 66 from the preceding radial recess 28 (for the particular axial recess under discussion, i.e. the first axial recess 30A, the preceding radial recess is the first radial recess 28A, and the succeeding radial recess is the second radial recess 28B) to a third area of intersection 68 with the succeeding radial recess 28B. It will be understood that even a permanently fixed position protuberance (described below) can traverse from the preceding radial recess 28A to the succeeding radial recess 28B via the axial recessed area 58.

The axial first and second side edges 62, 64 can extend in the tool forward direction $D_F$ from the preceding radial recess 28A.

More precisely, the axial first side edge 62 can extend axially along the circumferential surface 20 from the preceding radial recess 28A to the axial upper edge 60, thereby constituting a side abutment surface (particularly when a component comprising a protuberance is being removed from the anchorage arrangement, i.e. during disengagement of the rotating tool and the component).

The axial upper edge 60 can extend circumferentially along the circumferential surface 20 from the axial first edge 62, thereby constituting an axial upper abutment surface (allowing a user to feel that a protuberance, being moved along the axis has been halted and to subsequently redirect the movement thereof). Similar to the entry upper edge 40, an axial intermediate area 70 between the axial upper edge (or other edges) can be formed with a concave or ramping geometry between the axial recessed area and the axial upper edge.

The axial second side edge 64 (being the side edge of the axial recess furthermost in the tool rotation direction $D_{R1}$) can extend from the preceding radial recess 28A in the tool forward direction $D_F$ only until the third area of intersection 68.

In embodiments such as the one shown in FIGS. 1 to 9, where an axial recess (e.g., the final axial recess designated 30F) is also the final recess of an anchorage arrangement 24, an axial second edge 72 can extend to an axial upper edge 74.

Figure 9:
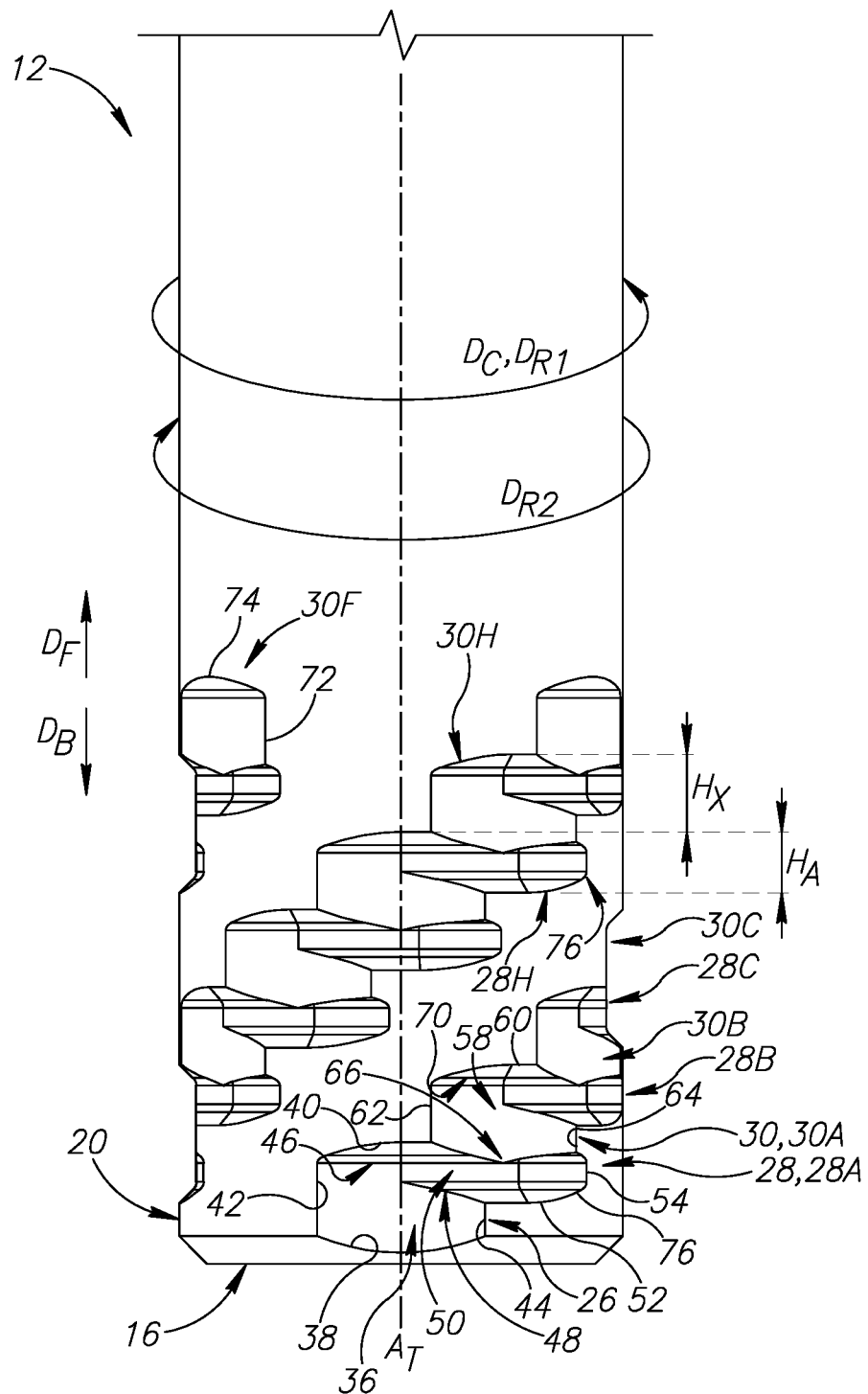
FIG. 9 is an identical side view of a portion of the rotating tool in FIGS. 1 to 4, similar to the view in FIG. 2 except rotated relative thereto.

Reverting to FIG. 9, it is noted that each radial recess 28 can further comprise an alignment portion 76 (indicated in this case with respect to the first radial recess 28A) extending further in the tool rotation direction $D_{R1}$ than the axial recess 30 succeeding the radial recess 28 (in this case the first axial recess 30A).

Accordingly, in addition to the method of production stated above, there can be further grinding of the radial recess 28 in the tool rotation direction $D_{R1}$, to form the first radial recess 28A. The grinding wheel can then be moved in the tool reverse-rotation direction $D_{R2}$ a smaller amount so that it is properly positioned. Then, the grinding wheel can be redirected to move in the tool forward direction $D_F$ to form the first axial recess 30A such that the radial side edge 54 is further in the tool rotation direction $D_{R1}$ than the axial second side edge 64.

For example, as shown in FIG. 4, the initial movement in the tool rotation direction $D_{R1}$ can extend a circumferential amount shown by the angle $\alpha$ which in this example is 35°, and the subsequent movement in the tool reverse-rotation direction $D_{R2}$ can extend a circumferential amount shown by the angle $\beta$ which in this case is 5°. While the movement ratio may differ, the initial movement in the tool rotation direction $D_{R1}$ should be greater than the subsequent movement in the tool reverse-rotation direction $D_{R2}$. It will also be noted that there may be no need for material removal in the subsequent movement.

The alignment portion 76 can have a tapering shape as shown.

Referring to FIG. 9, a radial recess is designated 28H and an axial recess is designated 30H for ease of visibility. The radial recess 28H and the alignment portion 76 thereof (ignoring the tapered shape) can have an alignment height $H_A$ measurable parallel with the tool axis $A_T$ which is smaller than an axial height $H_x$ of an axial recess.

It will be understood that a protuberance which is at least partially accommodated within an alignment portion will have no axial play and hence can preset an axial position of the rotating tool 12 and component 14 without the need for a further preset component (not shown).

Figure 7:
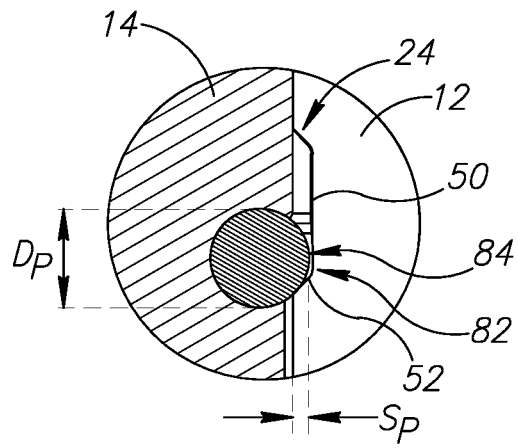
FIG. 7 is an enlarged view of an encircled portion in FIG. 6.
Figure 8:
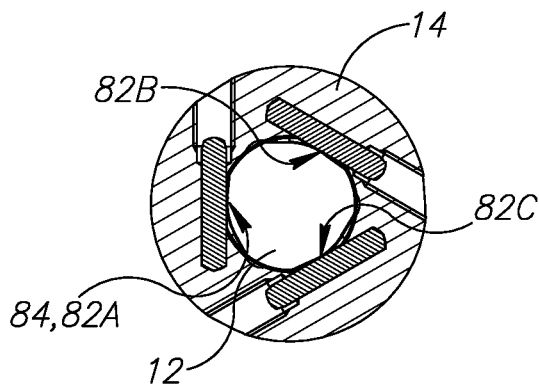
FIG. 8 is a cross section view taken along line VIII-VIII in FIG. 6.

Referring to FIGS. 6 to 8, the chuck 16 is shown in more detail.

The chuck 16 can comprise an internal circumferential surface 78 defining a tool-receiving bore and a bore axis $A_B$ defining opposite component forward and backward directions $B_F$, $B_B$ and opposite component rotation and rear-rotation directions $B_{R1}$, $B_{R2}$.

The internal circumferential surface 78 can be formed with a mating anchorage arrangement 80. More precisely the mating anchorage arrangement 80 can be in the form of at least one protuberance 82 (for example, first, second and third protuberances 82A, 82B, 82C). Since each protuberance 82 has the same geometry and orientation, only one will be described.

In the current example in which the shank portion 22A is cylindrical, the component's corresponding internal circumferential surface 78 can have a corresponding shape, i.e. a cylindrical shape.

As shown in FIG. 8, the three protuberances 82A, 82B, 82C can be equally circumferentially spaced around the internal circumferential surface 78.

Referring to FIG. 7, it can be seen that each protuberance 82 can comprise a protruding surface 84 for contacting the tool anchorage recess 24. Whether or not the protuberance has a circular cross section as shown (having a diameter $D_p$) only the relatively small protruding surface 84, extending a distance $S_p$, abuts the radial recess' lower edge 52. In the example shown the protuberance 84 remains spaced apart from the radial recessed area 50. It will be understood that a protuberance need only have a projecting surface 84 and that it is not necessary for the protuberance to extend into the chuck 14 as exemplified.

The protruding surface 84 can be, for example as shown in FIG. 8, constituted by an elongated convex surface. A preferred direction of elongation can be perpendicular to the bore axis $A_B$ (and perpendicular to the tool axis $A_T$ when the tool assembly 10 is assembled as shown in FIG. 6). However it will be understood that the direction of elongation could also be oblique relative to the bore axis.

In some embodiments, each protuberance is formed as a pin that is removably inserted into an opening formed in a peripheral outer surface of the chuck. Most preferably, however, each protuberance 82 is permanently connected to the chuck 14, which allows higher precision positioning and less falling parts etc. Nonetheless, in particular for purposes of maintenance, a removable protuberance is still a feasible option.

To achieve the assembled state shown in FIG. 6, a first possible set of assembly steps will be described also referring to FIG. 9.

The rear end 16 of the rotating tool 12 is inserted into the internal circumferential surface 78 in the component backward direction $B_B$ (and if needed rotated for alignment) such that each protuberance 82 projects into a respective entry recess 26. When each protuberance 82 abuts a respective entry upper edge 40 the rotating tool 12 is redirected to rotate in the tool reverse-rotation direction $D_{R2}$ (relatively, e.g. with the chuck 14 stationary) such that each protuberance 82 projects partially into a respective alignment portion 76 of the adjacent radial recess 28. Since each protuberance 82 has at least partially bypassed the succeeding axial recess 30 each protuberance 82 is prevented from moving axially relative to the tool 12 and abuts the lower radial edge 52 of the radial recess 28 (see FIG. 7). Thus the rotating tool 12 is effectively positioned in a single position relative to the chuck 14. Further, the positioning brings the protuberance 82 into contact with the lower radial edge 52 such that in a case of potential slip out even a small amount of slippage (until such abutment occurs) is prevented.

Alternatively, the movement in the tool reverse-rotation direction $D_{R2}$ can be less than is needed to bring each protuberance projects into the alignment portion 76 of the first radial recess 28A. Instead, the rotation can be just enough to locate each protuberance 82 underneath a succeeding axial recess 30 (by applying some axial force together with the rotational force) and the rear end 16 of the rotating tool 12 can thus be inserted further into the internal circumferential surface 78 in the backward bore direction $B_B$ until each protuberance 82 abuts a respective axial upper edge 60. Either this can constitute a possible final position (if the axial recess 30 is the final recess of the tool arrangement), or, preferably a final movement can be a further relative rotation of the tool 12 in the tool reverse-rotation direction $D_{R2}$ to secure the protuberances 82 in the radial recesses 28. It will be understood that such directional movements can be carried out until a desired relative position of the rotating tool in the chuck 14 is reached.

Subsequent to bringing the rotating tool 12 and chuck 14 to a desired preset position, a primary clamping force can be applied on the rotating tool 12 to secure the rotating tool 12 and chuck 14 together. Only upon insufficient gripping force of the component on the rotating tool 12 can the rotating tool 12 be moved, relatively, in the component forward direction $B_F$, at which stage such movement will be impeded by abutment of each protuberance 82 with the closest radial lower edge 52.

In embodiments where each elongated protuberance 82 is perpendicular relative to the tool axis $A_T$ as exemplified, it is preferred that the final recess of a tool anchorage arrangement 24 be a radial recess 28 as shown in the end mill 12' illustrated in FIG. 11. Notably, such example tool anchoring arrangement has a smaller number of recesses and different dimensions, but a generally similar stepped path.

Figure 10:
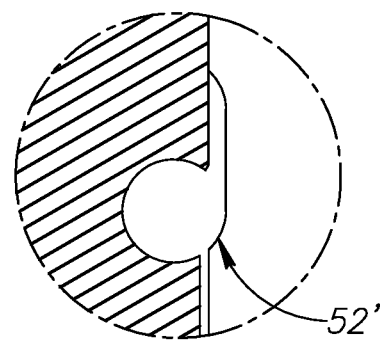
FIG. 10 is similar view to FIG. 7, albeit showing a different shaped recess and excluding the protuberance for visibility purposes only.

Yet a further preference, in particular where the elongated direction of a protuberance is perpendicular to the bore axis, is shown in FIG. 10. More precisely, the radial lower edge 52' can have a convex curvature corresponding to a convex curvature of a protuberance (not shown) intended to abut the radial lower edge, to allow more contact points.

In each embodiment, it will be noted that when a primary securing/clamping system of the rotating tool 12 and chuck 14 is insufficient, the protuberance 82 can abut a radial lower edge 52 to prevent pull-out.

Further, it is preferred that the tool anchorage arrangement extends around the tool circumferential surface 20 in the tool rotation direction $D_{R1}$ (or more precisely it spirals along both the tool forward direction $D_F$ and the tool rotation direction $D_{R1}$) with the tool rotation direction $D_{R1}$ being the same direction as the cutting direction $D_C$ of the rotating tool. Accordingly, if slippage rather than pull-out occurs, the protuberance 82 can provide a driving function to continue the desired cutting motion.

Notably, the anchorage arrangements can preferably be auxiliary clamping and/or driving arrangements intended to prevent slippage and pull-out. However it is feasible that such anchorage arrangements could also be applied to two components as a primary clamping arrangement.

What is claimed is:

1. A rotating tool having a tool axis defining opposite tool forward and backward directions and opposite tool rotation and reverse-rotation directions, the rotating tool comprising:
    a rear end;
    a front end located forward of the rear end; and
    a circumferential surface extending forward of the rear end;
the circumferential surface being formed with a tool anchorage arrangement;
the tool anchorage arrangement following a stepped path, the stepped path comprising:
    an entry recess extending forward from the rear end;
    a radial recess intersecting, and extending in the tool rotation direction from, the entry recess;
    an axial recess intersecting, and extending forward from, the radial recess;
    an additional radial recess intersecting, and extending in the tool rotation direction from, the axial recess, the additional radial recess being axially forward of the radial recess, along the tool axis; and
    an additional axial recess intersecting, and extending forward from, the additional radial recess.

2. The rotating tool according to claim 1, wherein:
    a starting recess of the tool anchorage arrangement is constituted by said entry recess; and
    an ending recess, distally located from the entry recess, is a radial recess intersecting, and extending in the tool rotation direction from, a preceding axial recess.

3. The rotating tool according to claim 1, wherein each radial recess has the same geometry as every other radial recess.

4. The rotating tool according to claim 1, wherein each axial recess has the same geometry as every other axial recess.

5. The rotating tool according to claim 1, wherein an extension of each radial recess extends in a direction perpendicular to the tool axis.

6. The rotating tool according to claim 1, wherein an extension of each axial recess extends in a direction parallel to the tool axis.

7. The rotating tool according to claim 1, wherein each radial recess further comprises an alignment portion which extends further in the tool rotation direction than a preceding axial recess.

8. The rotating tool according to claim 7, wherein the alignment portion has a tapering shape.

9. The rotating tool according to claim 7, wherein the alignment portion has an alignment height measurable parallel to the tool axis, the alignment height being smaller than an axial height of said preceding axial recess.

10. The rotating tool according to claim 1, further comprising two additional tool anchorage arrangements circumferentially spaced apart from one another, wherein each of the anchorage arrangements have the same geometry.

11. The rotating tool according to claim 10, wherein the entry recesses of the tool anchorage arrangements are equally circumferentially spaced about the tool axis.

12. The rotating tool according to claim 1, further comprising a cutting portion configured for machining when the rotating tool is rotated relative to a workpiece in the tool rotation direction.

13. The rotating tool according to claim 1, wherein the circumferential surface is an external surface of the tool.

14. The rotating tool according to claim 1, wherein the circumferential surface has a cylindrical shape.

15. A method of positioning a rotating tool in accordance with claim 1 in a chuck; the tool's circumferential surface being an external surface of the tool; the chuck comprising an internal circumferential surface defining a tool-receiving bore and a bore axis defining opposite component forward and backward directions and opposite component rotation and rear-rotation directions; the bore surface being formed with a mating anchorage arrangement configured to mate with the tool anchorage arrangement and comprising at least one protuberance extending inwardly into the bore; the method comprising the steps of:
(a) inserting the rotating tool's rear end into the chuck's tool-receiving bore in the component backward direction such that the at least one protuberance projects into the entry recess;
(b) subsequent to step (a), rotating the rotating tool relative to the chuck such that the at least one protuberance projects into the radial recess;
(c) subsequent to step (b), moving the rotating tool further in the component backward direction such that the at least one protuberance projects into the axial recess; and
(d) subsequent to step (c), if the rotating tool has not yet reached a final position in the chuck, repeating step (b) and, if needed, step (c) repeatedly so that the at least protuberance projects into one or more additional radial and axial recesses until the rotating tool is at said final position in the chuck.

16. The method according to claim 15, wherein the radial recess further comprises an alignment portion which extends further in the tool rotation direction than the axial recess, and
step (b) further comprises rotating the tool relative to the chuck until the at least one protuberance projects into the alignment portion, and
step (c) further comprises an initial sub-step of rotating the rotating tool relative to the chuck in a reverse-rotation direction a smaller amount than said rotation in step (b) such that the at least one protuberance is aligned with the axial recess to allow said moving of the rotating tool further in the component backward direction, as defined in step (c).

17. The rotating tool according to claim 1, wherein the stepped path comprises three or more radial recesses, each at different axial locations along the tool axis.

18. A rotating tool having a tool axis defining opposite tool forward and backward directions and opposite tool rotation and reverse-rotation directions, the rotating tool comprising:
a rear end;
a front end located forward of the rear end; and
a circumferential surface extending forward of the rear end;
the circumferential surface being formed with a tool anchorage arrangement;
the tool anchorage arrangement following a stepped path, the stepped path comprising:
an entry recess extending forward from the rear end;
a radial recess intersecting, and extending in the tool rotation direction from, the entry recess;
an axial recess intersecting, and extending forward from, the radial recess;
an additional radial recess intersecting, and extending in the tool rotation direction from, the axial recess; and
an additional axial recess intersecting, and extending forward from, the additional radial recess; wherein:
the stepped path comprises a total of three or more radial recesses, each at different axial locations along the tool axis.

* * * * *